(12) United States Patent
Dedenok et al.

(10) Patent No.: US 11,888,891 B2
(45) Date of Patent: Jan. 30, 2024

(54) SYSTEM AND METHOD FOR CREATING HEURISTIC RULES TO DETECT FRAUDULENT EMAILS CLASSIFIED AS BUSINESS EMAIL COMPROMISE ATTACKS

(71) Applicant: AO Kaspersky Lab, Moscow (RU)

(72) Inventors: Roman A. Dedenok, Moscow (RU); Nikita D. Benkovich, Moscow (RU); Dmitry S Golubev, Moscow (RU); Yury G. Slobodyanuk, Moscow (RU)

(73) Assignee: AO Kaspersky Lab, Moscow (RU)

( * ) Notice: Subject to any disclaimer, the term of this patent is extended or adjusted under 35 U.S.C. 154(b) by 303 days.

(21) Appl. No.: 17/473,367

(22) Filed: Sep. 13, 2021

(65) Prior Publication Data
US 2022/0255950 A1 Aug. 11, 2022

(30) Foreign Application Priority Data
Feb. 10, 2021 (RU) .................................. 2021103256

(51) Int. Cl.
H04L 9/40 (2022.01)
G06F 18/214 (2023.01)
H04L 51/08 (2022.01)

(52) U.S. Cl.
CPC .......... H04L 63/145 (2013.01); G06F 18/214 (2023.01); H04L 51/08 (2013.01); H04L 63/1416 (2013.01); H04L 63/1483 (2013.01)

(58) Field of Classification Search
CPC ... H04L 63/145; H04L 51/08; H04L 63/1416; G06F 18/214
See application file for complete search history.

(56) References Cited

U.S. PATENT DOCUMENTS 8,850,579 B1 * 9/2014 Kalinichenko ......... G06F 21/53
726/22
10,805,347 B2 * 10/2020 Bruss ..................... G06F 21/53
(Continued)

OTHER PUBLICATIONS

Han Y, Yang M, Qi H, He X, Li S. The improved logistic regression models for spam filtering. In2009 International Conference on Asian Language Processing Dec. 7, 2009 (pp. 314-317). IEEE. (Year: 2009).*

(Continued)

Primary Examiner — Catherine Thiaw
(74) Attorney, Agent, or Firm — ArentFox Schiff LLP; Michael Fainberg

(57) ABSTRACT

A method for creating a heuristic rule to identify Business Email Compromise (BEC) attacks includes filtering text of received email messages, using a first classifier, to extract one or more terms indicative of a BEC attack from the text of the received email messages. One or more n-grams are generated, using the first classifier, based on the extracted terms. A vector representation of the extracted terms is generated, using a second classifier, based on the generated one or more n-grams. The second classifier includes a logit model. A weight coefficient is assigned to each of the one or more extracted terms based on an output of the trained logit model. A higher weight coefficient indicates higher relevancy to BEC attack of the corresponding term. A heuristic rule associated with the BEC attack is generated by combining the weight coefficients of a combination of the one or more extracted terms.

20 Claims, 5 Drawing Sheets

(56) References Cited

U.S. PATENT DOCUMENTS

| | | | |
|---|---|---|---|
| 10,834,127 B1* | 11/2020 | Yeh | G06N 20/00 |
| 10,911,489 B1* | 2/2021 | Chechik | H04L 51/212 |
| 2018/0210876 A1* | 7/2018 | Cao | G06F 40/30 |
| 2020/0067861 A1* | 2/2020 | Leddy | G06F 21/6245 |
| 2020/0204572 A1 | 6/2020 | Jeyakumar et al. | |
| 2021/0019412 A1* | 1/2021 | Hewlett, II | G06F 21/565 |
| 2021/0058395 A1* | 2/2021 | Jakobsson | H04L 67/306 |
| 2021/0120022 A1* | 4/2021 | Kaderábek | H04L 63/1491 |
| 2021/0264116 A1* | 8/2021 | Thor | G06F 40/30 |
| 2022/0215167 A1* | 7/2022 | Rajpathak | G06F 40/30 |
| 2022/0230142 A1* | 7/2022 | Batchu | H04L 63/1425 |

OTHER PUBLICATIONS

Samantray OP, Tripathy SN. A knowledge-domain analyser for malware classification. In2020 International Conference on Computer Science, Engineering and Applications (ICCSEA) Mar. 1, 20203 (pp. 1-7). IEEE (Year: 2020).*

* cited by examiner

SYSTEM AND METHOD FOR CREATING HEURISTIC RULES TO DETECT FRAUDULENT EMAILS CLASSIFIED AS BUSINESS EMAIL COMPROMISE ATTACKS

This application claims benefit of priority under 35 U.S.C. 119(a)-(d) to a Russian Application No. 2021103256 filed on Feb. 10, 2021, which is incorporated by reference herein.

FIELD OF TECHNOLOGY

The present invention relates generally to the technical field of computer security and, more specifically, to systems and methods for creating heuristic rules to detect fraudulent emails classified as BEC (Business Email Compromise) attacks.

BACKGROUND

Modern cyber-criminals (e.g., hackers, attackers, fraudsters) are constantly looking for new methods of attacking organizations. Recently, they have increasingly turned to a method of attack known as Business Email Compromise (hereafter BEC attack). These attacks are characterized by the fact that they are in some way associated with the corporate communications using company mailboxes and email addresses that have been compromised. These BEC attacks enable fraudsters to compromise business correspondence for the purpose of financial fraud, accessing confidential information or undermining the reputation of the organization.

A BEC attack involves a targeted attack on an organization in which BEC scammers attempt to mimic the typical emails of the people they interact with by:
 a) starting a new conversation with an employee of the organization or make use of an existing one;
 b) gaining an employee's trust;
 c) persuading the employee to take actions that harm the interests of the organization or its customers.

Internal BEC attacks differ from other attack variants in that bogus emails are sent from legitimate e-mail addresses within the organization itself. In other words, the intruder first gains access to the mailbox of an employee of the organization in some way. Thus, anti-fraud technologies are not able to identify such an attack. These anti-fraud technologies may include e-mail authentication mechanisms, including, but not limited to: Domain Keys Identified Mail, Sender Policy Framework, and Domain-based Message Authentication, Reporting and Conformance. In addition, standard schemes designed to detect phishing and spam at the email level by looking for inconsistencies in technical email headers or by detecting altered spellings of email addresses are also unable to detect fraudulent attacks, if the email comes from a legitimate email address, in particular, an email address in the same domain.

Most often, an email classified as an internal BEC attack contains a request to transfer some sensitive information or even money to a client (supplier, contractor, tax body). The text of such email message may be supplemented with additional information which contains various social engineering ruses and is aimed at catching the receiver off guard. For example, the attackers may indicate urgency, such as, for example, "if we don't pay the bill today, we will have to pay a fine!!", or they may make threats, such as "I asked for payment to be made last month, how busy are you there, are you fed up of work?!", may imitate an ordering tone that does not allow any delays, or may take advantage of one of many other means of deception. Since BEC emails use a legitimate email address, the content of such an email appears convincing.

In addition, in internal BEC attacks emails contain links to a fake site with an address that differs from the address of the legitimate company (or agency) by one or two letters that are easily overlooked by email recipients. For example, the address may contain a capital letter "i" instead of a lowercase letter "I". Such a site may contain a payment form or, for example, a questionnaire for obtaining access to confidential information about users.

The following scenario illustrates a non-limiting example of an attack using an internal BEC attack email. An employee may receive an email from a manager's email address with the following text: "We have decided to send you to a conference, you need to urgently pay for participation from our account while there are still preferential places left." Furthermore, the text of the email may contain an electronic link to a highly prestigious event in the industry that the organization operates in. Such an attack is very likely to be successful because the employee is not likely to carefully examine the link sent in the email containing the manager's correct address and his/her signature.

Therefore, there is a need to enable detection of a fraudulent e-mail that is classified as an internal BEC attack.

SUMMARY

Disclosed are systems and methods for creating heuristic rules to detect fraudulent emails classified as BEC attacks.

Advantageously, created heuristic rules enable checking of emails for fraudulent messages belonging to the category of internal BEC attacks, and then applying the created heuristic rules on the client side of the electronic mailbox.

In one aspect, a method is proposed for creating a heuristic rule to identify Business Email Compromise (BEC) attacks. Text of received email messages is filtered, using a first classifier, to extract one or more parts of text (terms) indicative of a BEC attack from the text of the received email messages. The first classifier includes a trained recurrent neural network. One or more n-grams are generated, using the first classifier, based on the extracted terms. Each of the one or more n-grams characterizes a particular extracted term. A vector representation of the extracted terms is generated, using a second classifier, based on the generated one or more n-grams. The second classifier includes a logit model. The logit model is trained using the vector representation of the extracted terms. A weight coefficient is assigned to each of the one or more extracted terms based on an output of the trained logit model. A higher weight coefficient indicates higher relevancy to BEC attack of the corresponding term(s). A heuristic rule associated with the BEC attack is generated by combining the weight coefficients of a combination of the one or more extracted terms.

In one aspect, the heuristic rule associated with an internal BEC attacks is created by adding a condition to the heuristic rule that includes one or more attributes of the received email message indicating that the received email message comprises an internal email.

In one aspect, the one or more attributes indicating that the received email message comprises an internal email include at least one of: a domain in the sender's address of the email message and in recipient's address of the email message is the same, the sender's address of the email message is included in a list of trusted email addresses, an IP address of the sender of the email message is included in a list of trusted IP addresses.

In one aspect, one or more attributes indicating fraud may include information specified in the text of the received email message intended to steal money or information intended to steal confidential information.

In one aspect, the specified information includes at least information requesting payment of a bill, information requesting personal or corporate data that is not publicly available, a URL address to a third-party resource, or a file containing malicious code.

In one aspect, the trained recurrent neural network is pre-trained on a large number of open-source texts in at least one natural language.

In one aspect, the trained recurrent neural network comprises an Average-Stochastic Gradient Descent Weight-Dropped-Long Short Term Memory (AWD-LSTM) language model.

In one aspect, the AWD-LSTM language model is additionally trained in such a manner that an output layer of the AWD-LSTM language model predicts the presence of the BEC attack in the received email message.

In one aspect, the logit model is configured to use a logistical regression with an L1 regularizer.

In one aspect, the weight coefficient characterizes a degree of contribution of a particular term to final prediction of the correspondence of the received email messages to a BEC attack category or an internal BEC attack category.

In one aspect, the term includes a single word or a word combination.

In one aspect, the vector representation of the extracted terms is generated based on the one or more of n-grams using statistical measure of term frequency-inverse document frequency (TF-IDF) normalization and an L2 regularizer.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
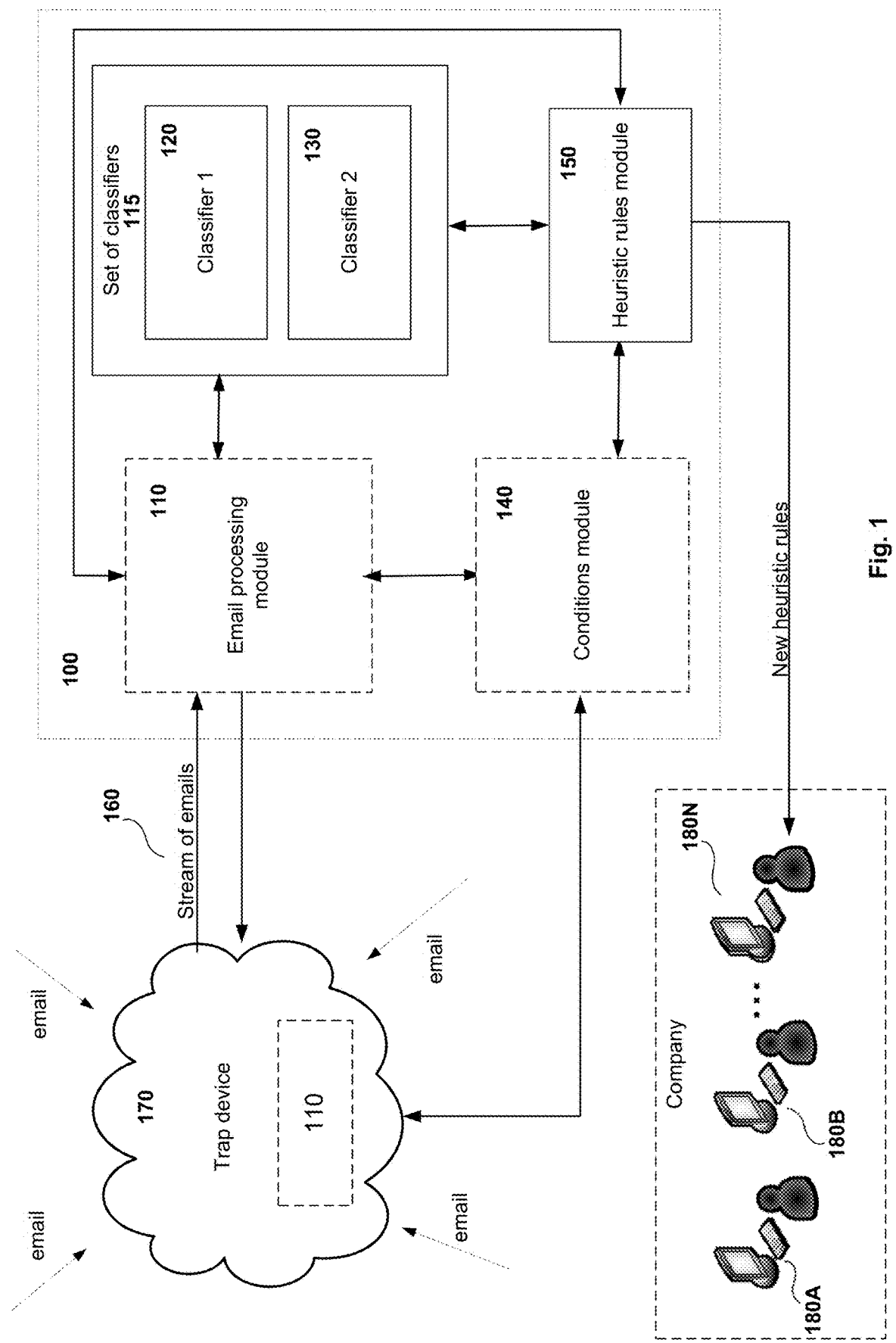
FIG. 1 illustrates an example structure of a system for creating heuristic rules for detecting internal BEC attacks.

Exemplary aspects are described herein in the context of a system, method, and computer program product for creating heuristic rules to detect fraudulent emails classified as BEC attacks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In some implementations, aspects of the present disclosure are directed an automated adaptive system that can protect users from fraud. More specifically, the described system is configured from fraud perpetrated by email messages, in particular, email messages associated internal BEC attacks. The term "internal BEC attacks," as used herein, refers to activities aimed at compromising business communications for the purpose of financial fraud, accessing confidential information, or undermining the reputation of an organization. Such activities are typically carried out using a legitimate electronic mail address. The used email address may be trusted, for example, such as, but not limited to, an email address in the same domain as the recipient's mailbox. For example, the sender's email address may belong to an employee of the same organization that the recipient of the email works for.

The remainder of the description may use concepts such as electronic mail, message, email address, mailbox or client and the like interchangeably. Different technologies and protocols intended to use these concepts can be used in conjunction with the solutions described here, but may be adapted accordingly.

An electronic mail message (also referred to as an email) typically has a specific structure. The structure of the email consists of two parts: the header and the body of the email. The header, in turn, contains a series of fields intended to be filled in, with each field being defined by its name (field header) and value. The field value typically contains some type of information. The body contains the message intended for the user. A message typically contains textual information in different languages, and can also be supplemented by links (URLs) to third-party resources, and/or files containing malicious code.

Also, in the context of the present disclosure, the term "spam", as used herein, refers to unwanted email (spam mail). Usually, spam mail may be sent in bulk. The term "fraud", as used herein, refers to unwanted and potentially dangerous email (malicious email). Spam emails may also include malicious emails. In some cases, it may be difficult to determine whether an email is spam or malicious. The aspects described here are primarily intended to block fraud, but in some cases they may also block spam.

The present disclosure also presents solutions aimed both at creating heuristic rules for detecting fraudulent emails, including emails associated with internal BEC attacks. Advantageously, at the presented solutions enable detection of these emails directly on the mail client installed on the user's computer, for example.

In an aspect, the creation of the heuristic rules is based on analysis of the stream of emails, in particular spam and fraudulent emails, using a set of classifiers comprising machine learning models. The combination of at least two classifiers performs automatic extraction of specific parts of textual messages from the specified emails and generates terms (phrases) from to detect fraudulent emails. As used herein, "term" refers both to a single word highlighted in the textual messages, as well as a specific sequence of words, i.e. a phrase.

In one exemplary aspect, the first classifier may be a pre-trained classifier (multilayer neural network) for the purpose of classifying the text of emails. In some aspects, an example of multilayer neural network is a language model which may be based on the Average-Stochastic Gradient Descent Weight-Dropped LSTM architecture (AWD-LSTM). This classifier may be configured to filter emails from the message stream based on the content of the email messages. The first classifier may be further configured to extract and certain parts—known as terms—from the email message text. In one aspect, the extracted terms may be subsequently represented in the form of n-grams. The second classifier may be a classifier containing a logistic regression with an L1 regularizer (hereafter referred to as a logit model). The second classifier may be configured to analyze the text in the filtered emails and, based on the extracted terms (phrases), may select the terms (phrases) most relevant to fraudulent emails. Furthermore, the second classifier may be configured to combine the terms into categories by analyzing the generated n-grams. In this case, the preliminary training of the second classifier may be carried out on the same n-grams from texts obtained as a result of the preliminary filtering of the emails using the first classifier. Further, heuristic rules may be created by combining the groups of selected terms (phrases) into categories.

As used herein, a heuristic rule is a set of conditions which when satisfied classifies a received email as a fraudulent email with a certain probability, in particular as one associated with internal BEC attacks, by performing an analysis of the text from the message of the email. At least one of the conditions may be a specific combination of at least one category of terms (a group of words) or n-grams constructed based on the extracted terms.

In another aspect of identifying fraudulent emails associated with internal BEC attacks, this heuristic rule may contain an additional condition on the basis of which an incoming email may be analyzed to determine whether the address is internal, i.e. trusted. This analysis may consist of comparing the domains of the sender and the recipient, or determining whether the sender's address is trusted.

In another aspect, the additional condition may be implemented separately from the heuristic rule. In this case, the analysis of the received email, using the given heuristic rules, may only be carried out after the additional condition is satisfied.

The classification of fraudulent emails as internal BEC attacks may typically take place before the email is presented to the user for viewing. Such email messages may be detected by analyzing the contents of the message in the body of the email using the created heuristic rules. As mentioned above, heuristic rules may allow a specific set of terms (phrases) to be detected in the text of the email message that indicates fraudulent activities. Such heuristic rules may improve the detection of fraudulent emails associated with internal BEC attacks.

Figure 5:
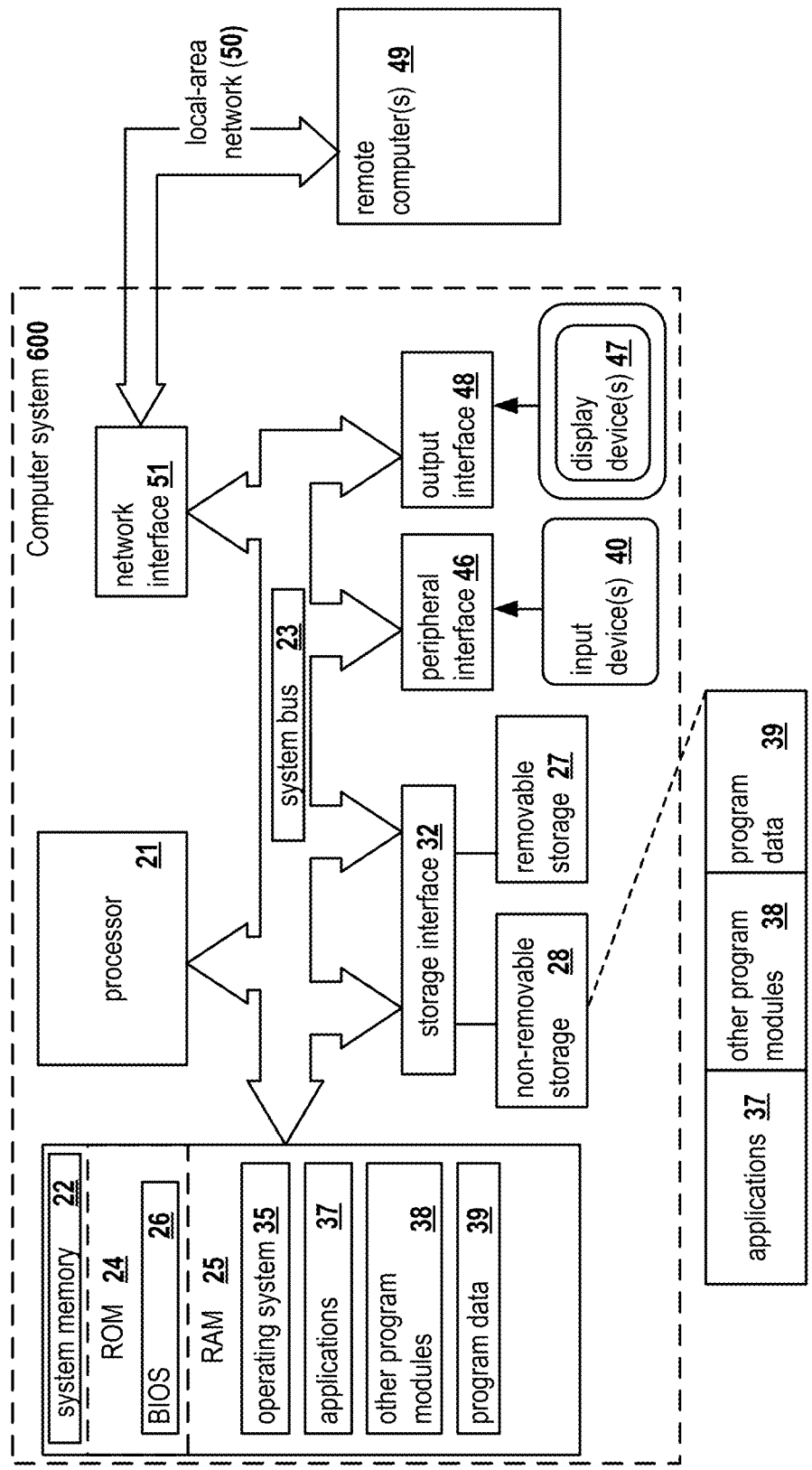
FIG. 5 shows an example of a computer system on which variant aspects of systems and methods disclosed herein may be implemented.

The presented solutions may be implemented using any modern digital computing device, for example, the computing device shown in FIG. 5. Examples of such a device are a server, including a mail server, a personal computer, a laptop and a mobile device such as a tablet computer or a smartphone. In a preferred variant of the described invention, one solution (detection of fraudulent emails) may be implemented on the internal mail server of the company or directly on the mail client installed on the user's computer. The other solution (creation of the heuristic rules for detecting fraudulent emails) may be implemented on a third-party device, for example, a server.

FIG. 1 illustrates a system for creating heuristic rules for detecting internal BEC attacks. The system 100 contains at least an email processing module 110, a set of classifiers 115 which includes at least a first classifier 120 and a second classifier 130, a conditions module 140 configured to provide the conditions for determining internal emails, and a heuristic rules module 150 configured to create heuristic rules. The system 100 may generate heuristic rules based on the processing and analysis of the email stream 160 received from the trapping device (hereafter referred to as the trap device) 170 configured to collect and store emails, including fraudulent emails. In one aspect, the trap device can comprise a honeyport.

The trap device 170, in one aspect, may be implemented in the form of a cloud-based server that collects spam emails, including fraudulent emails. In one aspect, this server may have a mailbox for intercepting relevant emails, wherein the mailbox may belong to non-existent or closed organizations. For example, the trap device 170 may collect millions of spam emails every day. The trap device 170 may provide the collected spam emails as a stream of emails 160 to the email processing module 110 for the initial analysis of spam emails and identification of emails containing indications of fraud. In one aspect, the email stream 160 may be delivered to the email processing module 110 via another cloud-based server, which can be the Kaspersky Security Network (KSN) system, for example. In another separate aspect, the trap device 170 may provide the collected spam emails directly to the set of classifiers 115 in the form of a stream of emails 160.

In one aspect, the emails for analysis may also be automatically received from the devices 180A, 180B . . . 180N of users who have consented to this, or the users may pass on the emails for analysis themselves. These devices can be part of a single group (of a business, company) or of different ones. Messages from the devices 180A, 180B . . . 180N may be transmitted by means of mail clients installed on the specified devices, or on mail servers associated with the specified devices. It should be noted that emails sent by users or transmitted with the users' agreement can be pre-filtered. During filtering, for example, emails may be anonymized by removing the header of the email and by removing some of the information from the text of the email which is not required for subsequent analysis.

The email processing module 110 may be configured to receive this stream of emails 160 and to select the emails containing the attributes in the email message that indicate fraud. Examples of such attributes may be information aimed at the theft of moneys or confidential information. For example, the attributes may contain information related to a request for payment of a bill, or a request to provide personal data or company data that cannot be obtained from public domain resources. The attributes may also contain a URL (Uniform Resource Locator) address to a third-party resource (such as a phishing site), an archive containing malicious code. In addition, the text of the emails may include additional information which may contain various social engineering ruses aimed at catching the recipient off guard. For example, this additional information may:
 indicate the urgency of meeting the demands given in the email,
 contain references to fines and other threats,
 relate to failure, for example, failure to meet an earlier demand,
 imitate a mandative tone that does not allow for delay,
 contain other information with other means of deception.
However, such information may indicate their association with fraud, since this information was extracted from spam emails.

The selection performed by the email processing module 110 may be preliminary, during which messages in the text of spam-emails may be analyzed to identify emails containing the indicated attributes. After the selection, the email processing module 110 may pass emails containing the indicated attributes to the set of classifiers 115.

It should be noted that the email processing module 110 may be implemented as part of the indicated system 100, as well as being part of the trap device 170. If the email processing module 110 is part of the trap device 170, an email stream 160 may be provided to the system 100 that contains only emails that contain the attributes indicating fraud.

The set of classifiers 115 may receive these emails, which may be submitted to the input of the first classifier 120.

The first classifier 120 may be configured to filter the messages received from the email processing module 110 based on the content of the messages in the emails in order to extract specific parts of textual messages (terms). As noted above "a term" refers to a single word a word combination (phrase), for example, a sequence of at least two words. Examples of terms are "bill to pay", "bill", "you must", "pay a bill", "fill in company details", "send by mail" and so on. Also, the classifier first 120 may be configured to convert the extracted terms into a specific form for subsequent analysis, for example, into n-grams.

In one aspect, the first classifier 120 may be a classifier which is pre-trained for the task of classifying the text of emails, comprising a first recurrent neural network, for example. The recurrent neural network may be a language model that is based on the AWD-LSTM architecture. The preliminary training of the first classifier 120 may consist of its initial training for understanding words of the particular language and a subsequent additional training on data (emails) from the trap device 170 to add additional words that are specific to spam-emails, including fraudulent emails, and also to adapt the first classifier 120 to the style of the specific spam-emails.

The initial training of the AWD-LSTM language model of the first classifier 120 may be carried out on a large number of texts obtained from open sources in the specific language, for example, from a source such as Wikipedia. Any training natural language can be used, depending on the language of the emails to be analyzed. In addition, a combination of two or more natural languages can be used. For example, English and Russian, Chinese and German, Spanish and Japanese. After the initial training, the AWD-LSTM language model of the first classifier 120 may be able to recognize/determine the structure of the languages on which it is trained.

The additional training of the AWD-LSTM language model of the first classifier 120 may be performed by modifying the final output layer in the language model and training it. It should be noted that modification of the final layer refers to modifying the weight coefficients of the connections between neurons in the layer. For example, in the given model, the final layer, which after pretraining made it possible to determine the subsequent words in the message from the analyzed text with a certain mathematical probability estimate, may be first replaced by a layer which can be used to determine whether the message in the text of the email is malicious. In particular, the replacing layer may be used to determine whether the message belongs to the category of BEC attacks or to the category of non-BEC attacks. The first classifier 120 may then further train (fine-tune) the AWD-LSTM language model with the replaced layer on data, for example, on parts of emails obtained from the email processing module 110, in order to enable it to determine with a given probability whether the extracted set of terms belongs to the BEC attack category. In one aspect, the data for the further training may include emails obtained directly from the trap device 170. The principle of further training is presented in the article "Universal Language Model Fine-tuning for Text Classification".

It should be noted that the fine-tuning of the AWD-LSTM language model with the modified final layer may occur in the same way as in the following example of teaching a person English language.

At first, the person reads many books in English and gradually learns it, then they may be shown the phrase "Roses are red" and may be prompted to choose a similar one from the examples below:

"Violets are blue",

"Work is over",

"Green Card".

Since a person understands that the phrase relates to flowers and color, they choose the first option. The aforementioned AWD-LSTM language model may train the final layer in a similar way, except phrases and words (terms) taken from fraudulent emails may be used as the examples of words and phrases.

Depending on the implementation of the disclosed system, fine-tuning of the AWD-LSTM language model of the first classifier 120 can be performed both in advance and during the creation of the heuristic rules and before filtering based on the content of the text in email messages to identify emails associated with BEC attacks. An example of a pre-trained first classifier 120 is the case when it is necessary to analyze new emails received to extract new terms or during the re-training of previously created heuristic rules that have produced an incorrect decision that does not meet a given threshold.

In other words, the first classifier 120 may filter emails received from the email processing module 110, using a trained neural network (AWD-LSTM language model). During filtering, the emails may be classified by the content of the messages and certain parts of the textual messages (terms) associated with BEC attacks may be extracted. Next, the trained first classifier 120 may generate n-grams from the extracted terms. Text contained in an email message that is unrelated to the detection of fraud or not associated with BEC attacks may not be considered when generating the n-grams.

In an aspect, the n-grams may be generated directly based on the number of words contained in terms. At the same time, in a particular aspect, the words contained in the terms can be converted beforehand into hash sums, from which the n-grams may then be generated. As used herein, the term "an n-gram" refers to the number of words contained in the term, equal to length n.

In an aspect, the first classifier 120 may pass the n-grams generated from the terms to the second classifier 130.

In a particular case, the generation of n-grams from word combinations may only performed for certain lengths. For example, the required lengths of n-grams for the second classifier 130 may be specified in advance based on their highest availability using the Term Frequency-Inverse Document Frequency (TF-IDF) metric from the second classifier 130. For example, the specified lengths may be 2, 3, and 5. Accordingly, the n-grams may be built only for terms containing 2, 3 or 5 words.

The second classifier 130 may be configured to generate vectors from the obtained n-grams, to train the second neural network and to use the trained neural network to determine the most relevant terms. for the identified most relevant terms may be used subsequently for generating heuristic rules to detect fraudulent emails, in particular, emails associated with (internal) BEC attacks.

In one aspect, the second classifier 130 may be used as a classifier which contains a logistic regression (logit model) with an L1 regularizer as the neural network. A logit model is a statistical model used to predict the probability of occurrence of a certain event based on the values of a set of terms. This regression outputs a response in the form of the probability of a binary event (1 or 0). The logit model may be trained on n-grams generated from texts obtained as a result of the preliminary filtering of emails by means of the first classifier 120.

In an aspect, the second classifier 130 may convert (transform) the terms obtained in the form of n-grams into a vector representation using the statistical measure of TF-IDF normalization and L2 regularization so that the values of the vectors vary between 0 and 1. Then, the second classifier 130 may perform the training of the logit model using the generated vectors.

should be noted that when training the logit model of the classifier second 130, the weight coefficient for each term may be selected such that the losses are minimal. In turn, the losses may be considered on the basis of what the model determines (predicts) at its output and the original target. For example, if the logic model predicts class 0 but the target is 1, then the losses will be large, and the logic model will try to match the weight so that the losses are reduced.

After training, since the logit model is linear, the weight coefficient for each term may be determined at the output of the logit model. These weight coefficients may be interpreted as the contribution of the term to the final prediction of the probability of their categorization as a BEC attack. The second classifier 130 may pass terms presented in the form of n-grams with positive weight coefficients to the heuristic rules module 150.

The conditions module 140 configured to provide the conditions for determining internal emails by creating or obtaining from external sources the attributes for identifying the email as an internal email. An example of an external In an aspect, the heuristic rules module 150 for creating heuristic rules may be configured to create heuristic rules based on a combination of groups of selected terms (phrases) obtained from the second classifier 130 and may be pre-grouped into categories. The combination operation may be based on the weight coefficients. In other words, a weighting may be performed. The set of the extracted terms that have the greatest effect in detecting fraudulent emails may be combined and added to the heuristic rule as a condition.

It i should be noted that heuristic rules which contain only sets of the extracted terms as conditions may allow fraudulent emails associated with BEC attacks to be detected. To create heuristic rules for detecting fraudulent emails associated with BEC attacks, a heuristic rule in the form of a condition may additionally contain the attributes of the condition module 140 for defining the email as an internal email.

In one aspect, the terms can be grouped into categories. Each category may be a list of terms that have been obtained by the first classifier 120. The process of combining terms into categories may be based on n-grams.

Examples of categories are shown below:

| Category | Category name | Terms in it |
|---|---|---|
| 1 | .../Phishing_test/ml_lm_bec_body | account automatically |
| 2 | .../Phishing_test/ml_bec_action | I have |

Thus, the heuristic rule may include a certain weighted combination of at least one category of terms that allow an email to be identified as a fraudulent email, in particular, as a fraudulent email associated with internal BEC attacks.

An example of a heuristic rule that categorizes a given email as an internal BEC attack is a rule that schematically has the following form:

The first part of the rule contains conditions:

```
Conditions = {
  1. Check for "internal" email transfer - the sender's address must match the
recipient's address:
    {check.from_domain, to_domain},
  2. Check the text of the message for "composite" categories (presence of a set of
attributes indicating fraud):
    [[
    {Category, "... /Phishing_test/ml_bec_action "},
    {Category, ".../Phishing_test/ml_lm_bec_body"},
    ]]
},
  The second part of the rule may contain the actions completed, for example,
taking a decision that the email belongs to the category of BEC attacks:
  Actions = {
  DoSetBEC
  }.
``` source is the trap device 170 or a cloud-based server. Examples of the attributes mentioned above may include, but are not limited to: the domain in the email sender's address is the same as the domain in the email recipient's address, the email sender's address is in the list of trusted addresses, the IP address of the email sender is in the list of trusted addresses.

If the email is identified as internal, the header of the email may be analyzed to identify the attribute indicating that the email is internal. The conditions module 140 may pass the attributes defining the email as internal to the heuristic rules module 150 for creating the heuristic rule.

In one aspect, after creating a heuristic rule the heuristic rules module 150 may perform a check for incorrect functioning. The check may be performed on the same emails or part of emails that were obtained from the trap device 170.

Figure 2:
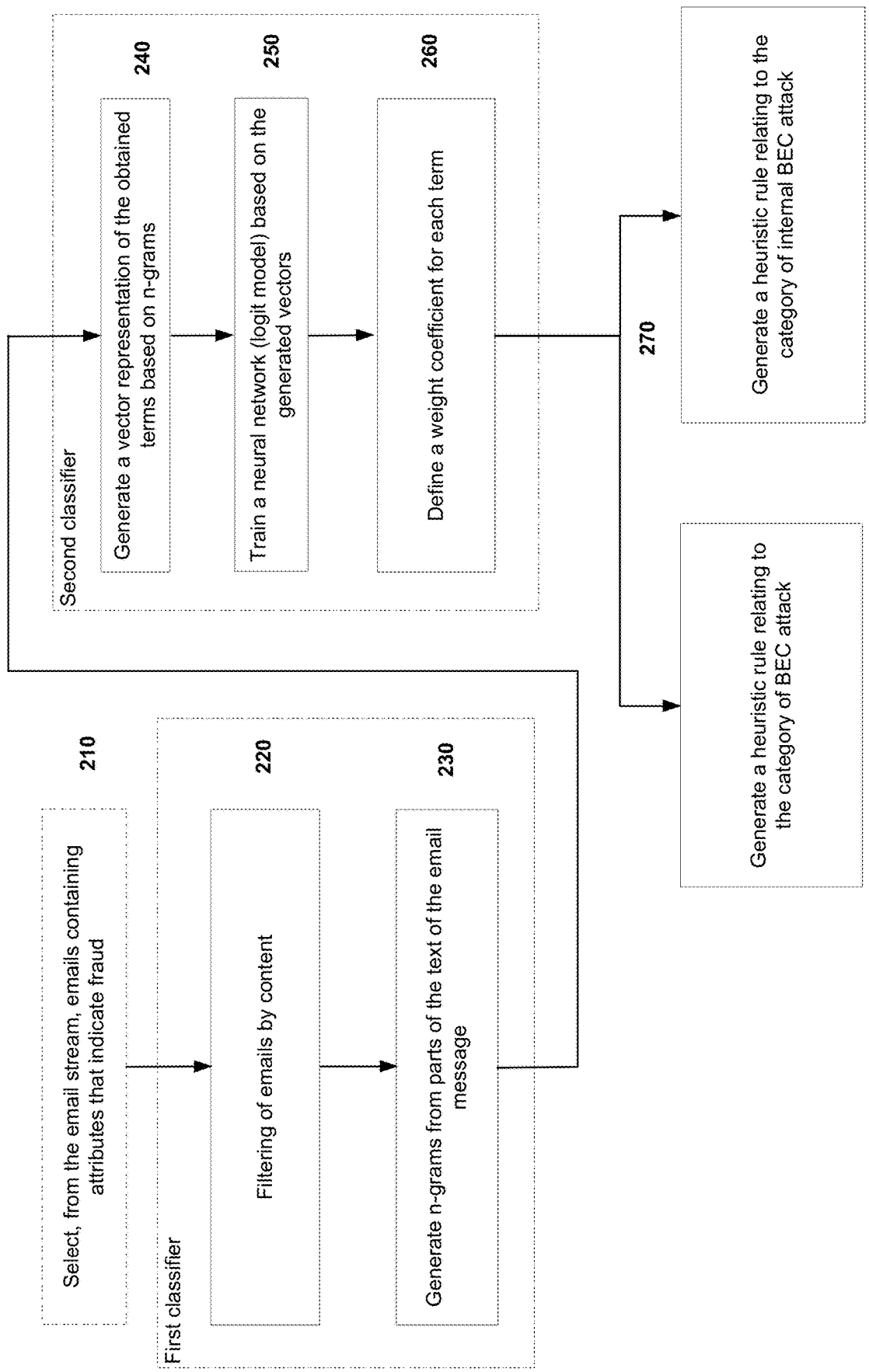
FIG. 2 illustrates a method for creating heuristic rules to detect internal BEC attacks.

FIG. 2 illustrates a method for creating heuristic rules for detecting fraudulent emails associated with internal BEC attacks. This method may be implemented using by the system 100, shown in FIG. 1. To create these heuristic rules, the system 100 receives a stream of emails 160, including fraudulent emails, from the trap device 170.

At 210, the email processing module 110 may selects from the incoming stream of emails 160 only emails that contain attributes in the message text indicating fraud.

Examples of attributes for the selection of emails were presented above in conjunction with FIG. 1.

It should be noted that step 210 can be an auxiliary step and can be performed outside of the described method. In this case, to create the specified heuristic rules, the system 100 may receive a stream of emails 160, which may contain emails containing attributes in the text of the message indicating fraud.

At 220, the first classifier 120 may filter the text in the messages of selected emails, during which certain parts of the textual messages (terms) relating to the category of BEC attacks may be extracted. As noted above, "a term" refers to either a single word or a combination of words (phrase), for example, a sequence of at least two words. It should be noted that the first classifier 120 may use a trained neural network to filter the emails. An example of such a network is the aforementioned AWD-LSTM language model, with additional training for the purpose of defining terms from the emails associated with the BEC attack. In other words, the additional training may allow the step of filtering of the emails to determine whether the text in the email message is fraudulent, in particular, belongs to the BEC attack category.

At 230, the first classifier 120 may generate n-grams from the extracted terms. Text contained in a message that is not relevant to the definition of fraud or to the category of BEC attack may not be considered by the first classifier 120 when creating n-grams.

In particular, the n-grams created by the first classifier 120, for example, in step 235 (not shown in FIG. 2), may be combined into categories based on the highest relevance of the n-gram to the corresponding category.

At 240, the second classifier 130 may convert (transform) the terms obtained in the form of n-grams into a vector representation using the statistical measure of TF-IDF normalization and L2 regularization so that the values of the vectors vary between 0 and 1.

At 250, the second classifier 130 trains the neural network that contains the second classifier 130 based on the generated vectors. A logit model may be used as the neural network. A logit model is a statistical model used to predict the probability of occurrence of a certain event based on the values of a set of terms.

At 260, the second classifier 130, at the output of the logit model, may determine the weight coefficient for each term for which the n-grams and vector were generated. This weight coefficient may be interpreted as the contribution of the term to the final possibility of determining with a given probability whether the extracted set of words belongs to the BEC attack or not. The higher the value of the coefficient, the more relevant the term is. In addition, only positive coefficients may be considered. Terms presented in the form of n-grams with positive weight coefficients may be passed to the heuristic rules module 150.

At step 270, the heuristic rules module 150, may generate at least one heuristic rule based on combining and weighting of combinations of selected terms which may be grouped into categories in advance. The set of the extracted attributes that have the greatest effect in detecting fraudulent emails may be combined and added to the heuristic rule as a condition. When using only a set of extracted terms for creating heuristic rules, these rules allow the detection of emails that are associated with BEC attacks. To generate heuristic rules for detecting fraudulent emails associated with BEC attacks, the heuristic rules module 150 may additionally use the attributes for defining an email as an internal email. An example of attributes used for defining internal emails are presented above in conjunction with FIG. 1.

In one particular aspect, the heuristic rules module 150 may create a heuristic rule for detecting an email relating to an internal BEC attack by combining at least one category of terms and using a single condition that can define the email as internal.

In another particular aspect, at least one condition may be obtained by the heuristic rules module 150 that allows the email to be identified as internal using the conditions module 140.

In another aspect, the conditions module 140 may be configured to create, or obtain from external sources, attributes for the identification of the email as an internal email.

In yet another aspect, the attributes identifying an email as an internal email may include:
  the domain in the email sender's address is the same as the domain in the email recipient's address,
  the email sender's address is in the list of trusted addresses,
  the IP address of the email sender is in the list of trusted addresses.

In one aspect, after creating a heuristic rule relating to the BEC attack or the internal BEC attack, the heuristic rules module 150 may perform its check for incorrect functioning. The check may be carried out on the same emails or parts of the emails that were received from the trap device 170 or the email processing module 110.

Figure 3:
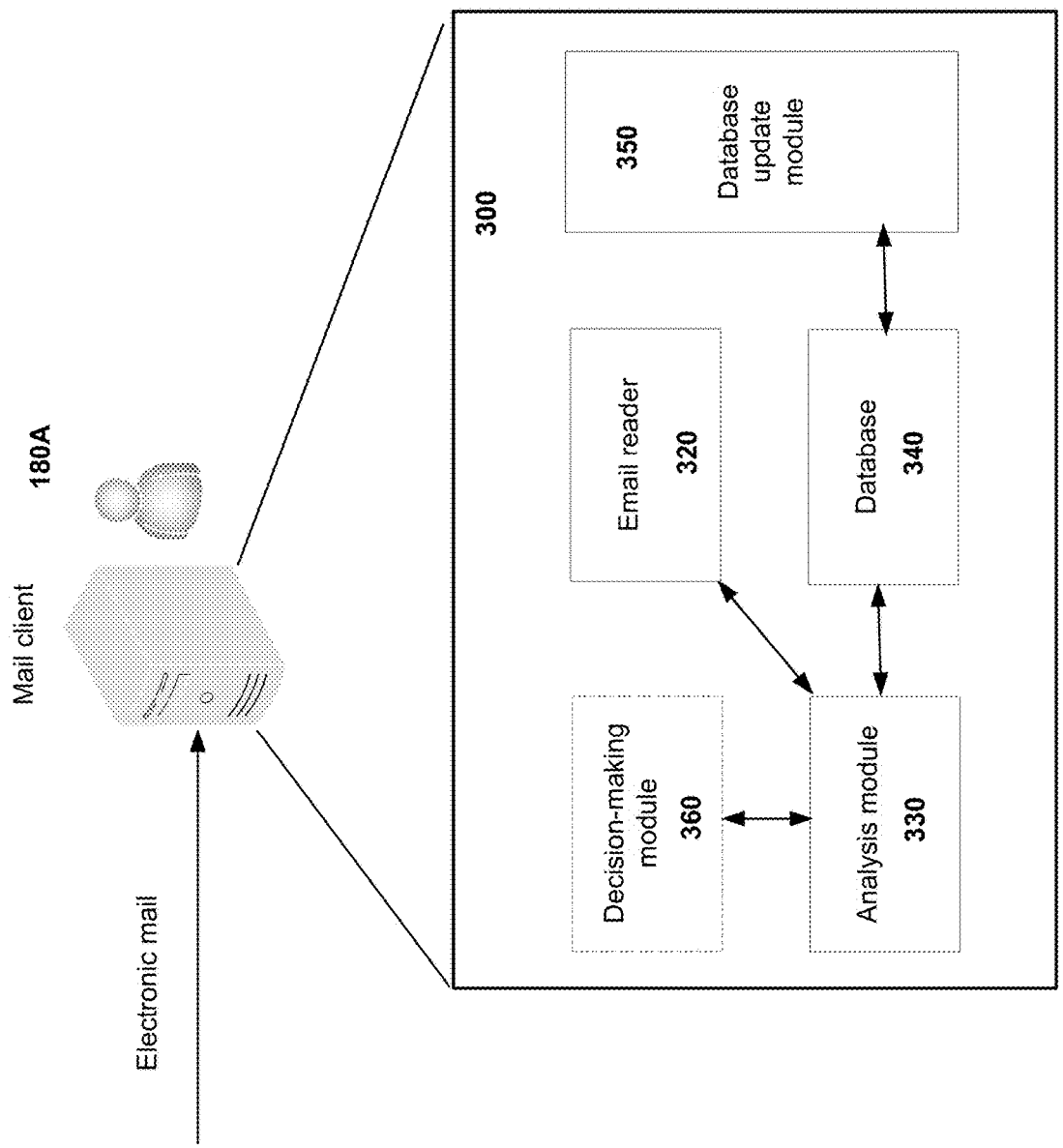
FIG. 3 illustrates an example structure of a system designed to detect internal BEC attacks.

FIG. 3 illustrates an example structure of a system designed to detect fraudulent emails associated with BEC attacks. The disclosed system 300 may also automatically respond to these fraudulent emails once they are detected. Responding refers to taking actions aimed at protecting user data via the user's device. For example, the fraudulent email can be blocked, the user can be informed that the email was identified as fraudulent, the email can be moved to a quarantine area, and other similar actions may be taken.

Users receive electronic mails over a network such as the internet or an intranet, such as the device 180A, using an email client through a mail server.

In an aspect of the system 300 designed to detect fraudulent emails associated with BEC attacks or the internal BEC attacks (hereafter the detection system 300), may be implemented within the mail client.

It should be noted that the mail client may receive emails both from an external network, such as the internet, and an internal network, such as an intranet. Examples of mail clients include mail clients such as Microsoft Outlook for desktop computers and mobile clients, such as Gmail on mobile devices, etc. Depending on the implementation, the mail client may be implemented on iOS, on Android, or installed from the server. Examples of mail servers are Microsoft Exchange, Microsoft online exchange servers, Gmail servers, SMTP servers, and the like. The mail client can be implemented using the programming languages, such as, but not limited to, C, Java, C++, PHP, Python, Perl, Ruby or any other suitable language.

The detection system 300 shown in FIG. 3 may include at least the following components: an email reader 320, an analysis module 330, a database 340, and a database update module 350. In particular aspects, the detection system 300 may include a decision-making module 360. In various implementations of the invention, the detection system 300 may be implemented using, for example, Java, C, C++ or any other suitable programming language.

The email reader 320 may be configured to receive and read a new incoming email, which may then be sent to the analysis module 330 by the email reader 320.

The analysis module 330 may be configured to analyze the received email by applying heuristic rules from the database 340. During the analysis, the analysis module 330 may determine the type of email (internal or external) to which the received email belongs by analyzing the email header. Once the type of the email is determined, the analysis module 330 may analyze the text of the email message, during which it may search for parts of the text (terms) indicating fraud that are associated with BEC attacks. These terms may be represented in heuristic rules in the form of conditions.

For example, if an email has been identified as internal, the analysis module 330 may analyze the text of the email message using heuristic rules that contain conditions for identifying the attributes relating to fraud inherent in the category of internal BEC attacks.

If at least one heuristic rule is activated, the analysis module 330 may identify the received email as a fraudulent email associated with internal BEC attacks. In addition, the analysis module 330 may informs the decision-making module 360 of the detection of a fraudulent email and may quarantine the fraudulent email in the database 340.

The database 340 may be configured to store various data, in particular, two types of heuristic rules: heuristic rules designed to detect fraudulent emails belonging to the category of BEC attacks; heuristic rules designed to detect fraudulent emails belonging to the category of internal BEC attacks.

In some aspects, the database 340 may be implemented as a file or any other appropriate data store.

The database update module 350 may be configured to obtain new heuristic rules from external systems, such as the system 100, and to transfer different types of data to external systems. Examples of data transferred may be emails, including fraudulent emails, and the results of the operation of heuristic rules from the database 340. The data transferred can be used for further processing for the purpose of dynamic updating or training/creating new heuristic rules, as described above in conjunction with FIG. 1.

The decision-making module 360 may be configured to determine further remedial actions aimed at protecting the user's data after a fraudulent email has been identified. These remedial actions may involve analyzing the fraudulent email and its impact on the user's computer (PC), in particular the email client. Examples of such actions may include, but are not limited to:

launching an anti-virus scan both on the PC of the user who received the email and on the PC of the user who sent the email, if the email is internal;

launching an Endpoint Detection and Response (EDR) analysis to detect a possible attack on the internal or external network via which the email was sent.

Figure 4:
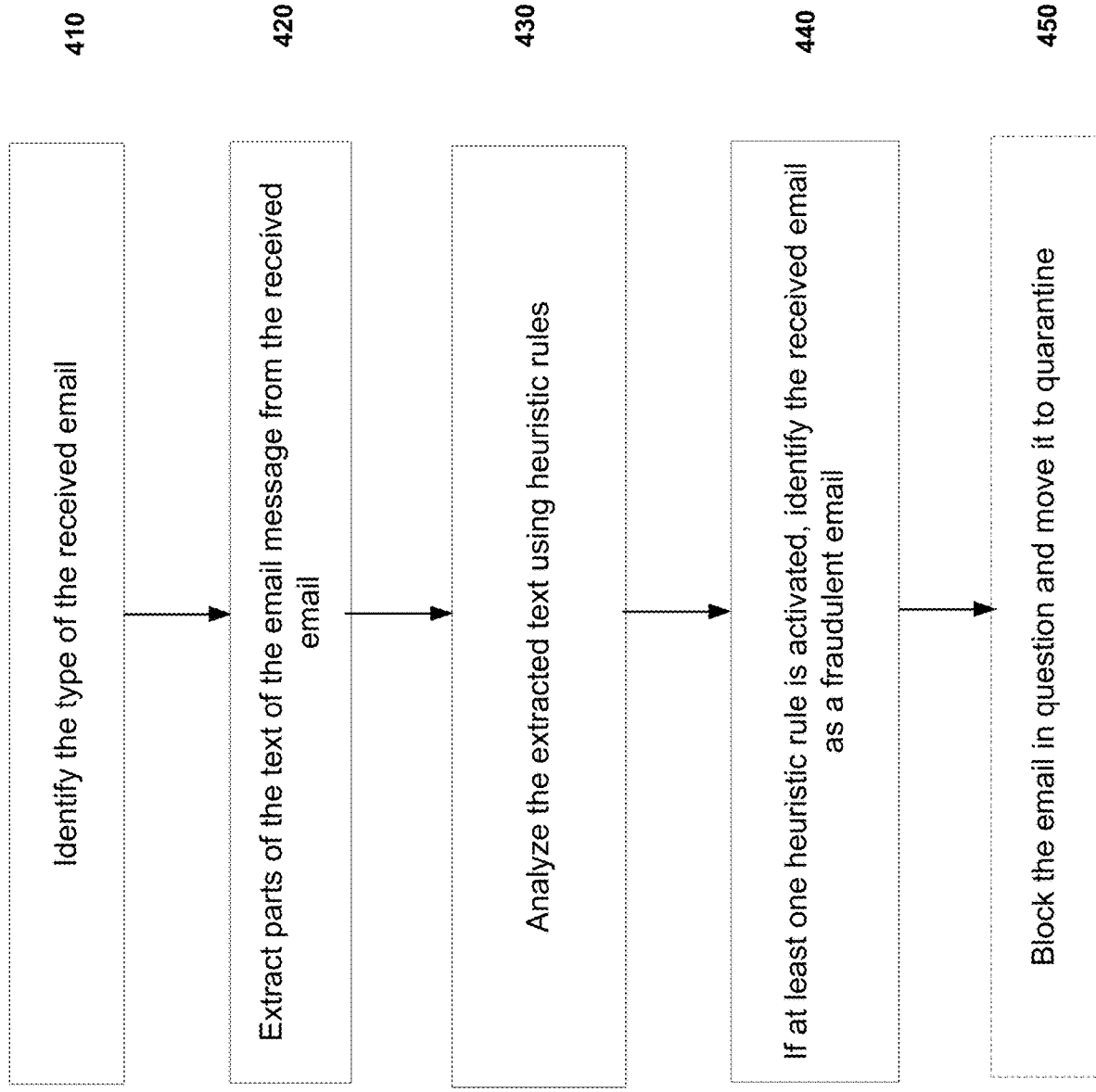
FIG. 4 illustrates a method for detecting internal BEC attacks.

FIG. 4 illustrates a method for detecting fraudulent emails associated with internal BEC attacks. The method may be implemented using resources of the detection system 300 described in FIG. 3. In particular, the disclosed method may be implemented by the analysis module 330 configured to use heuristic rules for detection of fraudulent emails associated with internal BEC attacks.

At 410, the analysis module 330 may identify the type of the received email as an internal email using heuristic rules, based on an analysis of the email header.

At 420, the analysis module 330 may extract the text of the email message from the given email.

At 430, the analysis module 330 may analyze the extracted text using heuristic rules to identify parts of the message text (terms) that meet the conditions indicating fraud.

At 440, if at least one heuristic rule is activated, the analysis module 330 may identify the received email as a fraudulent email associated with internal BEC attacks.

At 450, if an email is identified as fraudulent, the decision making module 360 may block the email in question and move it to quarantine.

It should be noted that the emails collected in quarantine can be both used for further analysis on the mail client side, and transferred to the system 100, for example, using the trap device 170. For example, this functionality enables dynamic database update or training/creation of heuristic rules, as described above.

In a particular aspect, additionally at 450, the decision making module 360 may initiate an anti-virus scan both on the PC of the user who received the email and on the PC of the user who sent the email.

In another particular aspect, at 450 the decision making module 360 may additionally initiate an incident analysis (Endpoint Detection and Response or EDR) to detect a possible attack on the internal network from which the email was sent.

FIG. 5 shows an example of a computer system 20 on which variant aspects of systems and methods disclosed herein may be implemented. The computer system 20 may represent the computer system 100 of FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 300.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 300 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for creating a heuristic rule to identify Business Email Compromise (BEC) attacks, the method comprising:
    filtering text of received email messages, using a first classifier, to extract one or more terms indicative of a BEC attack from the text of the received email messages, wherein the first classifier includes a trained recurrent neural network;
    generating, using the first classifier, one or more n-grams based on the extracted terms, wherein each of the one or more n-grams characterizes a particular extracted term;
    generating, using a second classifier, a vector representation of the extracted terms based on the generated one or more n-grams, wherein the second classifier comprises a logit model;
    training the logit model using the vector representation of the extracted terms;
    assigning a weight coefficient to each of the one or more extracted terms based on an output of the trained logit model, wherein a higher weight coefficient indicates higher relevancy to BEC attack of the corresponding term; and
    generating a heuristic rule associated with the BEC attack by combining the weight coefficients of a combination of the one or more extracted terms.

2. The method according to claim 1, wherein the heuristic rule associated with an internal BEC attacks is created by adding a condition to the heuristic rule that includes one or more attributes of the received email message indicating that the received email message comprises an internal email.

3. The method according to claim 2, wherein the one or more attributes indicating that the received email message comprises an internal email include at least one of: a domain in the sender's address of the email message and in recipient's address of the email message is the same, the sender's address of the email message is included in a list of trusted email addresses, an IP address of the sender of the email message is included in a list of trusted IP addresses.

4. The method according to claim 1, wherein one or more attributes indicating fraud may include information specified in the text of the received email message intended to steal money or information intended to steal confidential information.

5. The method according to claim 4, wherein the specified information includes at least information requesting payment of a bill, information requesting personal or corporate data that is not publicly available, a URL address to a third-party resource, or a file containing malicious code.

6. The method according to claim 1, wherein the trained recurrent neural network is pre-trained on a large number of open-source texts in at least one natural language.

7. The method according to claim 1, wherein the trained recurrent neural network comprises an Average-Stochastic Gradient Descent Weight-Dropped-Long Short Term Memory (AWD-LSTM) language model.

8. The method according to claim 7, wherein the AWD-LSTM language model is additionally trained in such a manner that an output layer of the AWD-LSTM language model predicts the presence of the BEC attack in the received email message.

9. The method according to claim 1, wherein the logit model is configured to use a logistical regression with an L1 regularizer.

10. The method according to claim 1, wherein the weight coefficient characterizes a degree of contribution of a particular term to final prediction of the correspondence of the received email messages to a BEC attack category or an internal BEC attack category.

11. The method according to claim 1, wherein the term comprises a single word or a word combination.

12. The method according to claim 1, wherein the vector representation of the extracted terms is generated based on the one or more of n-grams using statistical measure of term frequency-inverse document frequency (TF-IDF) normalization and an L2 regularizer.

13. A system for creating a heuristic rule to identify Business Email Compromise (BEC) attacks, the system comprising:
    a hardware processor configured to:
    filter text of received email messages, using a first classifier, to extract one or more terms indicative of a BEC attack from the text of the received email messages, wherein the first classifier includes a trained recurrent neural network;
    generate, using the first classifier, one or more n-grams based on the extracted terms, wherein each of the one or more n-grams characterizes a particular extracted term;
    generate, using a second classifier, a vector representation of the extracted terms based on the generated one or more n-grams, wherein the second classifier comprises a logit model;
    train the logit model using the vector representation of the extracted terms;
    assign a weight coefficient to each of the one or more extracted terms based on an output of the trained logit model, wherein a higher weight coefficient indicates higher relevancy to BEC attack of the corresponding term; and
    generate a heuristic rule associated with the BEC attack by combining the weight coefficients of a combination of the one or more extracted terms.

14. The system according to claim 13, wherein the hardware processor is further configured to select from a stream of the received email messages only email messages containing one or more attributes indicating fraud in the text of the received message and to provide the selected email messages to the first classifier.

15. The system according to claim 13, wherein the hardware processor is further configured to assign one or more conditions comprising one or more email attributes for classifying the received email message as an internal email, and wherein the hardware processor is configured to use the one or more conditions to generate the heuristic rule.

16. System according to claim 15, wherein the one or more attributes indicating that the received email message comprises an internal email include at least one of: a domain in the sender's address of the email message and in recipient's address of the email message is the same, the sender's address of the email message is included in a list of trusted email addresses, an IP address of the sender of the email message is included in a list of trusted IP addresses.

17. The system according to claim 13, wherein the trained recurrent neural network comprises an Average-Stochastic Gradient Descent Weight-Dropped-Long Short Term Memory (AWD-LSTM) language model.

18. The system according to claim 17, wherein the AWD-LSTM language model is additionally trained in such a manner that an output layer of the AWD-LSTM language model predicts the presence of the BEC attack in the received email message.

19. The system according to claim 13, wherein the logit model is configured to use a logistical regression with an L1 regularizer.

20. A non-transitory computer readable medium storing thereon computer executable instructions creating a heuristic rule to identify Business Email Compromise (BEC) attacks, including instructions for:
  filtering text of received email messages, using a first classifier, to extract one or more terms indicative of a BEC attack from the text of the received email messages, wherein the first classifier includes a trained recurrent neural network;
  generating, using the first classifier, one or more n-grams based on the extracted terms, wherein each of the one or more n-grams characterizes a particular extracted term;
  generating, using a second classifier, a vector representation of the extracted terms based on the generated one or more n-grams, wherein the second classifier comprises a logit model;
  training the logit model using the vector representation of the extracted terms;
  assigning a weight coefficient to each of the one or more extracted terms based on an output of the trained logit model, wherein a higher weight coefficient indicates higher relevancy to BEC attack of the corresponding term; and
  generating a heuristic rule associated with the BEC attack by combining the weight coefficients of a combination of the one or more extracted terms.

* * * * *